(12) United States Patent
Condo et al.

(10) Patent No.: US 9,034,459 B2
(45) Date of Patent: *May 19, 2015

(54) INFRARED REFLECTING FILMS FOR SOLAR CONTROL AND OTHER USES

(75) Inventors: Peter D. Condo, Lake Elmo, MN (US); Janet R. Kirkman, Minneapolis, MN (US); Clark I. Bright, Tucson, AZ (US); Walter Stoss, Tucson, AZ (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 420 days.

This patent is subject to a terminal disclaimer.

(21) Appl. No.: 12/810,110

(22) PCT Filed: Dec. 16, 2008

(86) PCT No.: PCT/US2008/086954
§ 371 (c)(1), (2), (4) Date: Aug. 24, 2010

(87) PCT Pub. No.: WO2009/085741
PCT Pub. Date: Jul. 9, 2009

(65) Prior Publication Data
US 2010/0316852 A1    Dec. 16, 2010

Related U.S. Application Data

(60) Provisional application No. 61/017,477, filed on Dec. 28, 2007.

(51) Int. Cl.
| | |
|---|---|
| *B32B 3/00* | (2006.01) |
| *B32B 7/02* | (2006.01) |
| *B32B 15/04* | (2006.01) |
| *B05D 5/06* | (2006.01) |
| *C03C 17/00* | (2006.01) |
| *G02B 1/10* | (2006.01) |
| *C03C 17/36* | (2006.01) |
| *B32B 17/10* | (2006.01) |
| *G02B 5/28* | (2006.01) |

(52) U.S. Cl.
CPC .............. *C03C 17/366* (2013.01); *B32B 17/10* (2013.01); *B32B 17/10036* (2013.01); *B32B 17/10174* (2013.01); *B32B 17/10761* (2013.01); *G02B 5/282* (2013.01); *G02B 5/287* (2013.01)

(58) Field of Classification Search
CPC .... C23C 14/20; C23C 14/562; C23C 14/024; C23C 14/086; C23C 14/205; C23C 28/00; B32B 27/00; B32B 27/08; B32B 27/36; B32B 27/065; B32B 27/12; B32B 27/285; B32B 27/30; B32B 27/32; B32B 17/10; B32B 17/1022; B32B 17/10018; B32B 17/10036; B32B 17/10174; B32B 17/10761; B32B 2367/00; B32B 29/00; B32B 5/024; B32B 5/026; B32B 5/022; B32B 2437/00; B32B 15/046; B32B 2037/246; B32B 2038/0092; B32B 2255/02; B32B 2255/10; B32B 2255/205; B32B 2255/28; B32B 2262/0261; B32B 2266/0207; B32B 2266/23; B32B 17/00; G02F 1/161; G02F 1/13452; G02F 1/153; G02F 1/1533; G02F 1/155; G02F 1/163; G02F 1/13342; G02F 1/1339; G02F 1/15; G02F 1/157; G02F 2202/023; G02F 2202/28; G02F 2202/36; G02F 2202/50; G02F 2202/00; G02F 2202/02; G02F 2001/1536; G02B 5/287; G02B 5/0808; G02B 1/111; G02B 1/116; G02B 5/208; G02B 5/282; C03C 12/00; C03C 17/366; B29D 11/00
USPC .............. 428/463, 437, 442, 195.1, 461, 457, 428/500, 627, 522, 626, 138, 141, 1.1, 201, 428/221, 421, 458, 469, 480, 535, 135, 142, 428/143, 147, 148, 149, 209, 213, 216, 428/314.4, 324, 328, 329, 32.1, 330, 331, 428/344, 34.4, 34.7, 403, 405, 407, 408, 428/40.6, 412, 414, 419, 41.5, 471, 508, 428/513, 515, 65.1, 688, 689, 699, 701, 428/702, 704, 913, 914, 95, 163.1; 219/203; 296/84.1; 359/360, 265, 273, 359/275, 585, 586, 601, 614, 1, 267, 3, 580, 359/582, 588; 174/254; 204/192.1; 29/458, 29/623.1

See application file for complete search history.

(56) References Cited

U.S. PATENT DOCUMENTS

| | | | |
|---|---|---|---|
| 3,529,074 A | | 9/1970 | Lewis |
| 3,601,471 A | * | 8/1971 | Seddon .................. 359/584 |
| 4,486,561 A | * | 12/1984 | Chung et al. .................. 524/107 |
| 4,639,069 A | | 1/1987 | Yatabe et al. |
| 4,645,714 A | | 2/1987 | Roche et al. |
| 4,696,719 A | | 9/1987 | Bischoff |
| 4,722,515 A | | 2/1988 | Ham |
| 4,782,216 A | | 11/1988 | Woodard |
| 4,786,783 A | | 11/1988 | Woodard |
| 4,842,893 A | | 6/1989 | Yializis et al. |
| 4,954,371 A | | 9/1990 | Yializis |
| 5,018,048 A | | 5/1991 | Shaw et al. |
| 5,032,461 A | | 7/1991 | Shaw et al. |
| 5,097,800 A | | 3/1992 | Shaw et al. |
| 5,104,929 A | | 4/1992 | Bilkadi |
| 5,125,138 A | | 6/1992 | Shaw et al. |
| 5,324,374 A | | 6/1994 | Harmand et al. |
| 5,332,888 A | | 7/1994 | Tausch et al. |
| 5,440,446 A | | 8/1995 | Shaw et al. |
| 5,464,667 A | | 11/1995 | Kohler et al. |
| 5,547,908 A | | 8/1996 | Furuzawa et al. |
| 5,773,102 A | | 6/1998 | Rehfeld |
| 6,045,864 A | | 4/2000 | Lyons et al. |
| 6,132,882 A | | 10/2000 | Landin et al. |
| 6,171,661 B1 | * | 1/2001 | Zheng et al. .................. 427/535 |
| 6,214,422 B1 | | 4/2001 | Yializis |
| 6,231,939 B1 | | 5/2001 | Shaw et al. |
| 6,348,237 B2 | | 2/2002 | Kohler et al. |
| 6,352,761 B1 | | 3/2002 | Hebrink et al. |
| 6,368,699 B1 | | 4/2002 | Gilbert et al. |
| 6,793,796 B2 | * | 9/2004 | Reid et al. .................. 205/102 |
| 6,797,396 B1 | | 9/2004 | Liu et al. |
| 6,811,867 B1 | | 11/2004 | McGurran et al. |
| 6,830,713 B2 | | 12/2004 | Hebrink et al. |
| 6,867,539 B1 | | 3/2005 | McCormick et al. |
| 6,929,864 B2 | | 8/2005 | Fleming et al. |
| 6,933,051 B2 | * | 8/2005 | Fleming et al. .................. 428/463 |
| 6,936,131 B2 | | 8/2005 | McCormick et al. |
| 7,015,640 B2 | | 3/2006 | Schaepkens et al. |
| 7,018,713 B2 | | 3/2006 | Padiyath et al. |
| 7,189,447 B2 | | 3/2007 | Conway et al. |
| 7,215,473 B2 | | 5/2007 | Fleming |
| 2005/0212139 A1 | * | 9/2005 | Leinikka et al. .................. 257/762 |
| 2006/0087230 A1 | | 4/2006 | Ghosh et al. |
| 2007/0020451 A1 | | 1/2007 | Padiyath et al. |
| 2008/0196664 A1 | | 8/2008 | David et al. |
| 2010/0089621 A1 | * | 4/2010 | Stoss et al. .................. 174/254 |

FOREIGN PATENT DOCUMENTS

| | | |
|---|---|---|
| JP | 59-26251 | 2/1984 |
| JP | 111843 | 6/1984 |
| JP | 2005-536061 | 11/2005 |
| JP | 2007-220402 | 8/2007 |
| KR | 10-2005-0050082 | 5/2005 |
| WO | WO 00/26973 | 5/2000 |
| WO | WO 01/96115 | 12/2001 |
| WO | WO 2004/016560 | 2/2004 |
| WO | WO 2004/017700 | 2/2004 |
| WO | WO 2004/017701 | 2/2004 |
| WO | WO 2006/093702 | 9/2006 |
| WO | WO 2007/084386 | 7/2007 |
| WO | WO 2007/087281 | 8/2007 |
| WO | WO 2007/149683 | 12/2007 |
| WO | WO 2008/027863 | 3/2008 |

OTHER PUBLICATIONS

Affinito et al., "Polymer-Oxide Transparent Barrier Layers", Society of Vacuum Coaters 39th Annual Technical Conference Proceedings, Paper No. W-12, (1996), pp. 1-6.

Affinito et al., "Vacuum Deposited Polymer/Metal Multilayer Films for Optical Application", *Thin Solid Films* 270, (1995), pp. 43-48.

Shaw et al., "A New High Speed Process for Vapor Depositing Acrylate Thin Films: An Update", Society of Vacuum Coaters 36th Annual Technical Conference Proceedings, (1993), pp. 348-352.

Shaw et al., "A New Vapor Deposition Process for Coating Paper and Polymer Webs", 6th International Vacuum Coating Conference, (1992), pp. 96-101.

Shaw et al., "Use of Evaporated Acrylate Coatings to Smooth the Surface of Polyester and Polypropylene Film and Aluminum Foil Substrates", RadTech '96 North America UV/EB Conference Proceedings, vol. II, (1996), pp. 701-707.

Shaw et al., "Use of Vapor Deposited Acrylate Coatings to Improve the Barrier Properties of Metallized Film", Society of Vacuum Coaters 37th Annual Technical Conference Proceeding (1994), pp. 240-247.

\* cited by examiner

*Primary Examiner* — Mark Ruthkosky
*Assistant Examiner* — Laura C Powers
(74) *Attorney, Agent, or Firm* — James A. Baker; Lisa P. Fulton

(57) ABSTRACT

Solar control films containing a visible light-transmissive flexible support, a first nucleating oxide seed layer, a first metal layer, an organic spacing layer, a second nucleating oxide seed layer, a second metal layer and a polymeric protective layer. The thicknesses of the metal layers and spacing layer are such that the films are visible light-transmissive and infrared-reflective. The films have high visible light transmittance, high Reflected Energy and low Total Solar Heat Transmission.

18 Claims, 4 Drawing Sheets

INFRARED REFLECTING FILMS FOR SOLAR CONTROL AND OTHER USES

CROSS-REFERENCE TO RELATED APPLICATION

This application claims the benefit of the filing date of Provisional Application No. 61/017,477 filed Dec. 28, 2007, the disclosure of which is incorporated herein by reference.

FIELD OF THE INVENTION

This invention relates to solar control films and glazing, including vehicular glazing.

BACKGROUND

Solar control films are used in automotive window glass and other vehicular glazing to reduce solar heat gain, interior temperatures and air conditioning loads. Commercially available solar control films include XIR™-70, XIR-75, V-KOOL™ and Hüper Optik™ films from Southwall Corporation, ULTRA PERFORMANCE™ 75 film from Bekaert Specialty Films, LLC, S-LEC™ sound and solar film from Sekisui Chemical Co., Ltd. and various films from CPFilms Inc. Coated glass products with solar control features include SUNGATET™ windshields from PPG Industries, Inc. and SOLARSHIELD™ glass from AFG Industries, Inc. These film and coated glass products are intended to reject or absorb infrared (or in some cases ultraviolet) energy while transmitting visible light. Unfortunately, good infrared rejection and good visible transparency are inversely related. It can be difficult to obtain desired solar control levels while still satisfying applicable visible light transparency ($T_{vis}$) requirements. For example, European Standard ECE R-43 requires a $T_{vis}$ of at least 75% for windshields and at least 70% for sidelights and backlights. U.S. Federal Motor Vehicle Safety Standard 205 (49 C.F.R Part 571.205), SAE ANSI Z26.1-1996 and Japanese Standard JIS Safety Regulations for Road Vehicles, Article 29 require a $T_{vis}$ of at least 70% for motor vehicle glazing.

There remains a need for solar control films having high visible light transmission and good solar control characteristics.

SUMMARY OF THE INVENTION

The present invention provides, in one aspect, a solar control film comprising in sequence at least a visible light-transmissive flexible support, a first nucleating oxide seed layer, a first metal layer, an organic spacing layer, a second nucleating oxide seed layer, a second metal layer and a polymeric protective layer, wherein the thicknesses of the metal layers and spacing layer are such that the film is visible light-transmissive and infrared-reflective.

The invention provides in another aspect a laminated glazing article comprising in sequence at least a first glazing material layer, a first mechanical energy-absorbing layer, the disclosed solar control film, a second mechanical energy-absorbing layer and a second glazing material layer.

The invention provides in another aspect a method for forming a solar control film, which method comprises:

a) providing a visible light-transmissive flexible support, b) forming a first nucleating oxide seed layer atop the support, c) forming a first metal layer atop the first seed layer, d) forming an organic spacing layer atop the first metal layer, e) forming a second nucleating oxide seed layer atop the spacing layer, f) forming a second metal layer atop the second seed layer, and g) forming a polymeric protective layer atop the second metal layer, wherein the thicknesses of the metal layers and spacing layer are such that the film is visible light-transmissive and infrared-reflective.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1:
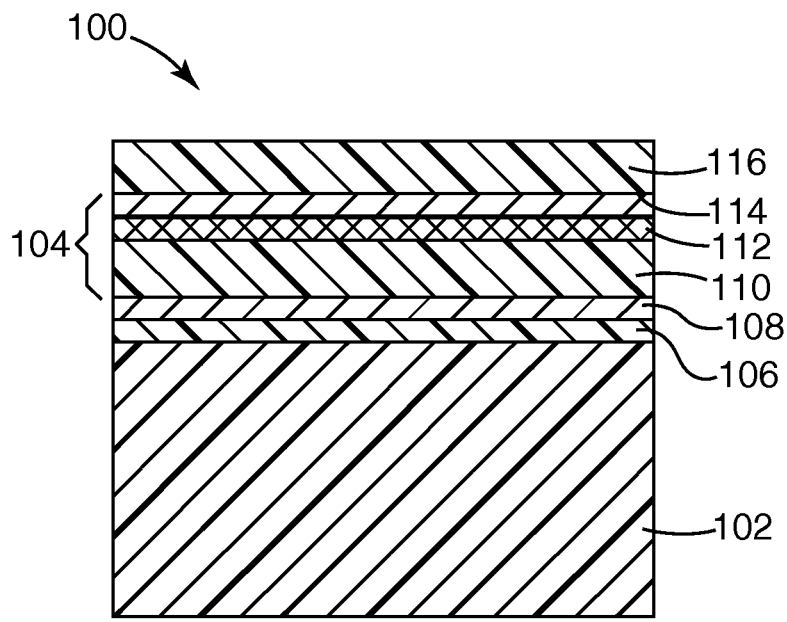
FIG. 1 and FIG. 2 are schematic cross-sectional views of solar control films.

The words "a", "an", and "the" are used interchangeably with "at least one" to mean one or more of the elements being described. By using words of orientation such as "atop", "on", "uppermost", "underlying" and the like for the location of various elements in the disclosed coated articles, we refer to the relative position of an element with respect to a horizontally-disposed, upwardly-facing support. It is not intended that the films or articles should have any particular orientation in space during or after their manufacture.

The term "compound curvature" when used with respect to a surface or article means the surface or article curves in two different, non-linear directions from a single point.

The term "copolymer" includes both random and block copolymers.

The term "crosslinked" when used with respect to a polymer means the polymer has polymer chains joined together by covalent chemical bonds, usually via crosslinking molecules or groups, to form a network polymer. A crosslinked polymer is generally characterized by insolubility, but may be swellable in the presence of an appropriate solvent.

The term "extensible" when used with respect to a solar control film means that the film can be stretched by at least about 3% in an in-plane direction without forming visible discontinuities in the film as detected by the naked eye at a distance of about 0.25 meters.

The term "infrared-reflective" when used with respect to a support, layer, film or article means the support, layer, film or article reflects at least about 50% of light in a band at least 100 nm wide in a wavelength region from about 700 nm to about 4,000 nm, measured at a near-normal angle (e.g., at about a 6° angle of incidence).

The term "light" means solar radiation.

The term "metal" includes pure metal and metal alloys.

The term "non-planar" when used with respect to a surface or article (e.g., of glass or other glazing material) means the surface or article has a continuous, intermittent, unidirectional or compound curvature.

The term "optical thickness" when used with respect to a layer means the physical thickness of the layer times its in-plane index of refraction.

The term "optically clear" when used with respect to a solar control film or laminated glazing article means that there is no visibly noticeable distortion, haze or flaws in the film or article as detected by the naked eye at a distance of about 1 meter.

The term "polymer" includes homopolymers and copolymers, as well as homopolymers or copolymers that may be formed in a miscible blend, e.g., by coextrusion or by reaction, including, e.g., transesterification.

The term "Reflected Energy" ("Re") refers to energy reflected in the wavelength range from 250 to 2,500 nm.

The terms "visible light transmittance" or "visible light-transmissive" when used with respect to a support, layer, film or article mean the support, layer, film or article has greater than 50% visible light transmittance at 550 nm.

The term "without substantial cracking or creasing" when used with respect to a solar control film in a laminated glazing article means that there are no visible discontinuities in the film as detected by the naked eye at a distance of about 1 meter, preferably about 0.5 meters.

The term "without substantial wrinkling" when used with respect to a solar control film in a laminated glazing article means that there are no small ridges or furrows resulting from contraction of the smooth film surface as detected using the naked eye at a distance of about 1 meter, preferably about 0.5 meters. Referring to FIG. 1, an exemplary solar control film is shown generally at 100.

Film 100 includes flexible support 102 in the form of a visible light-transmissive plastic film (made, for example, from polyethylene terephthalate ("PET")) and a stack 104 of layers atop support 102. Stack 104 includes first nucleating oxide seed layer 106 (made, for example, of zinc oxide), first metal layer 108 (made, for example, of silver), organic spacing layer 110 (made, for example, from a crosslinked acrylate), second nucleating oxide seed layer 112 (also made, for example, of zinc oxide) and second metal layer 114 (also made, for example, of silver). Protective polymer layer 116 (made, for example, from a crosslinked acrylate) lies atop second metal layer 114. Protective polymer layer 116 limits damage to stack 104 and may also alter the optical properties of the stack. Support 102, first seed layer 106, first metal layer 108, organic spacing layer 110, second seed layer 112, second metal layer 114 and protective polymer layer 116 may be adjacent to one another or may be separated by one or more additional layers not shown in FIG. 1. The seed layers 106 and 112, metal layers 108 and 114 and organic spacing layer 110 are each visible light transmissive (as is film 100 as a whole), and at least first metal layer 108, organic spacing layer 110 and second metal layer 114 are continuous. Seed layers 106 and 112 need not be continuous and may be much thinner than the metal layers 108 and 114 or organic spacing layer 110. For example, seed layers 106 and 112 may each be a series of small islands which serve as nucleation sites aiding in the deposition of a more uniform or more dense overlying metal layer. The thicknesses of metal layers 108 and 114, the intervening organic spacing layer 110 and stack 104 are chosen so that metal layers 108 and 114 are sufficiently thin to be partially reflective and partially transmissive, and are spaced apart sufficiently by layer 110 so that film 100 will be visible light-transmissive and infrared-reflective. For example, spacing layer 110 may have an optical thickness that is about ¼ to ½ the wavelength of the center of a desired pass band for transmitted light and stack 104 may represent a Fabry-Perot interference stack. Light whose wavelength is within the pass band will mainly be transmitted through metal layers 108 and 114. Light whose wavelength is above or below the pass band will mainly be reflected by metal layers 108 and 114.

Figure 2:
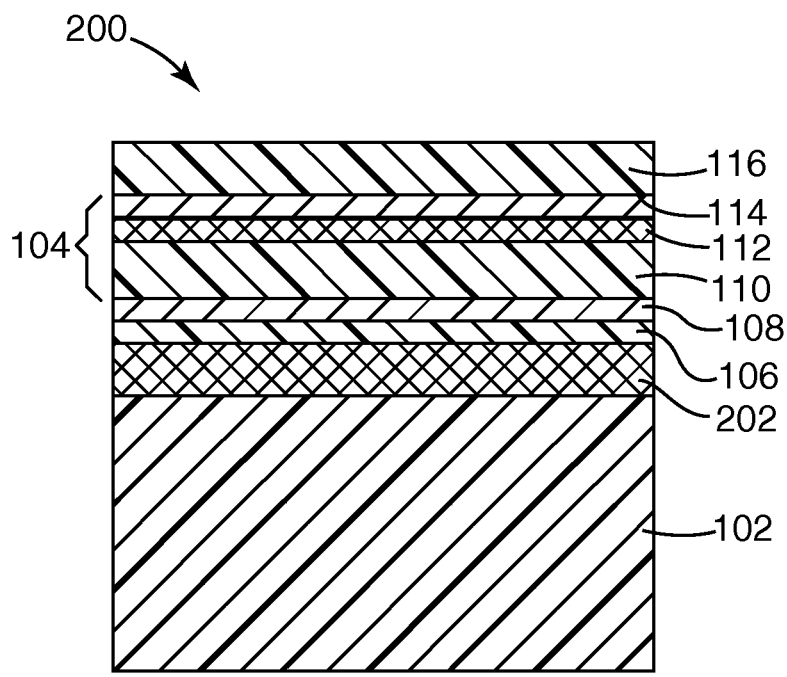

In FIG. 2, another exemplary solar control film is shown generally at 200. Film 200 resembles film 100 but includes an organic base coat layer 202 (made, for example, from a crosslinked acrylate) between support 102 and first seed layer 106. Base coat layer 202 helps smooth over surface roughness and other defects in support 102, and aids in the eventual deposition of smoother metal layers 108 and 114. Base coat layer 202 may also alter the optical properties of stack 104. Base coat layer 202 may if desired be a hardcoat layer containing filler particles (not shown in FIG. 2, but made, for example, of high refractive index particles such as zinc oxide nanoparticles) which may provide an increase in hardness (as determined using, for example, a pencil hardness test on the exposed hardcoat) compared to a base coat layer that does not contain such filler particles. When appropriately selected, the filer particles may also provide increased visible light transmission through article 200 compared to an article made without such particles. Despite being buried beneath stack 104 and protective polymer layer 116, a hardcoat surprisingly may impart improved durability to stack 104 (as manifested for example by improved abrasion resistance or pencil hardness tests conducted on article 200) compared to articles having a stack coated on a softer base coat or coated directly on support 102. Both a softer base coat layer and a hardcoat layer may be employed if desired, and their order may be reversed.

Figure 3:
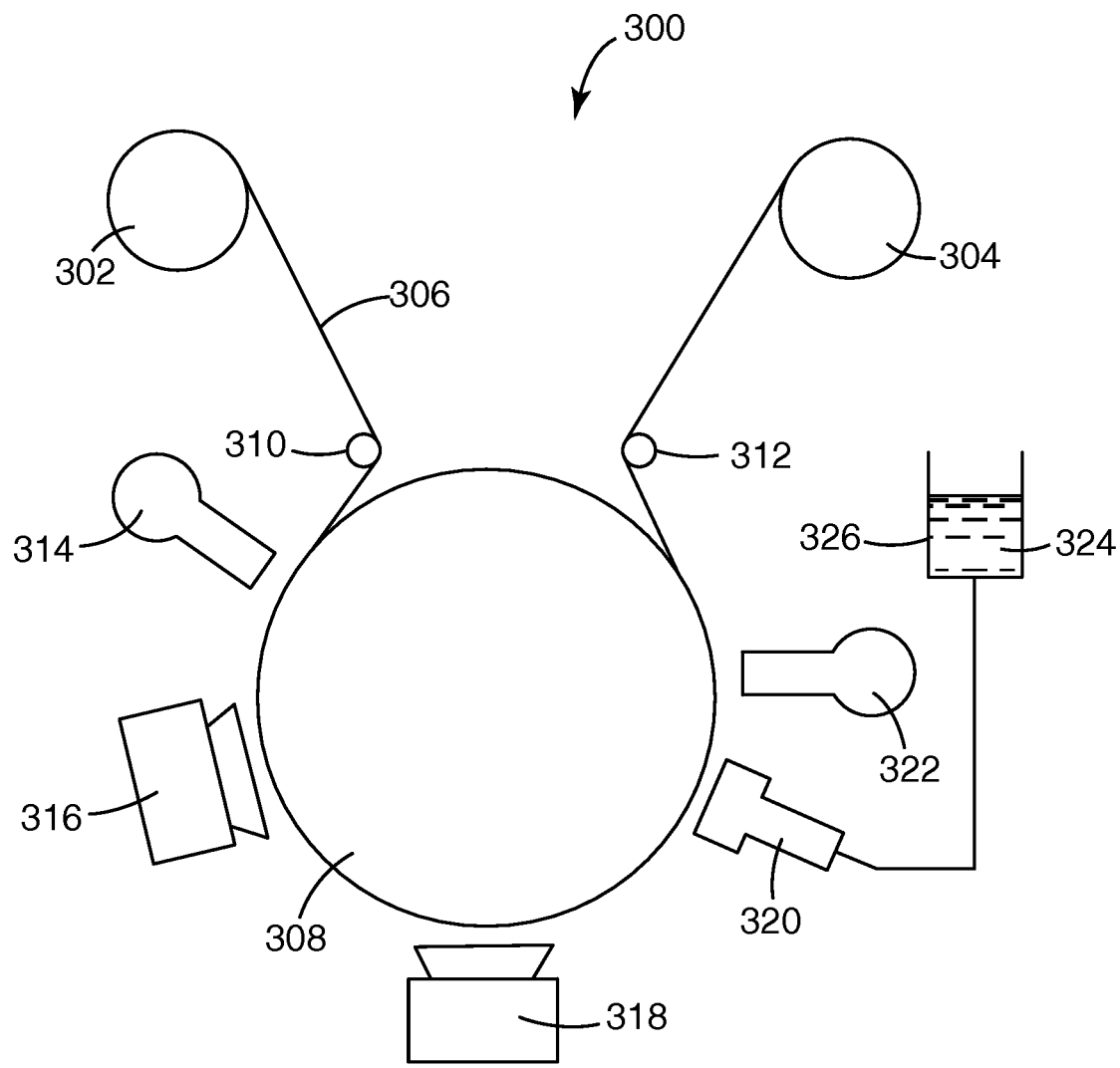
FIG. 3 is a schematic view of an apparatus for making a solar control film.

FIG. 3 shows an exemplary apparatus 300 which may conveniently be used to manufacture the disclosed solar control films. Powered reels 302 and 304 move support 306 back and forth through apparatus 300. Temperature-controlled rotating drum 308 and idlers 310 and 312 carry support 306 past plasma pretreater 314, seed metal or seed metal oxide sputtering applicator 316, reflective metal sputtering applicator 318, evaporator 320 and E-beam crosslinking apparatus 322. Liquid monomer or oligomer 324 is supplied to evaporator 320 from reservoir 326. In a first pass through apparatus 300, a first nucleating oxide seed layer such as layer 106, a first metal layer such as layer 108 and an organic spacing layer such as layer 110 may be applied to or formed on support 306. The organic spacing layer may serve as a temporary protective layer that limits damage to the first metal layer while freshly-coated support 306 is rewound from reel 304 back onto reel 302. A second pass through apparatus 300 may be used to apply or form a second nucleating oxide seed layer such as layer 112, a second metal layer such as layer 114 and a polymeric protective layer such as layer 116. Apparatus 300 can be enclosed in a suitable chamber (not shown in FIG. 3) and maintained under vacuum or supplied with a suitable inert atmosphere in order to discourage oxygen, water vapor, dust and other atmospheric contaminants from interfering with the various pretreatment, coating, crosslinking and sputtering steps. Reactive gases (e.g., oxygen or water vapor) may also be introduced into apparatus 300 (or may outgas from the support or from the chamber itself) to bring about intentional interference, e.g., to convert a metal layer to an oxide layer.

Figure 4:
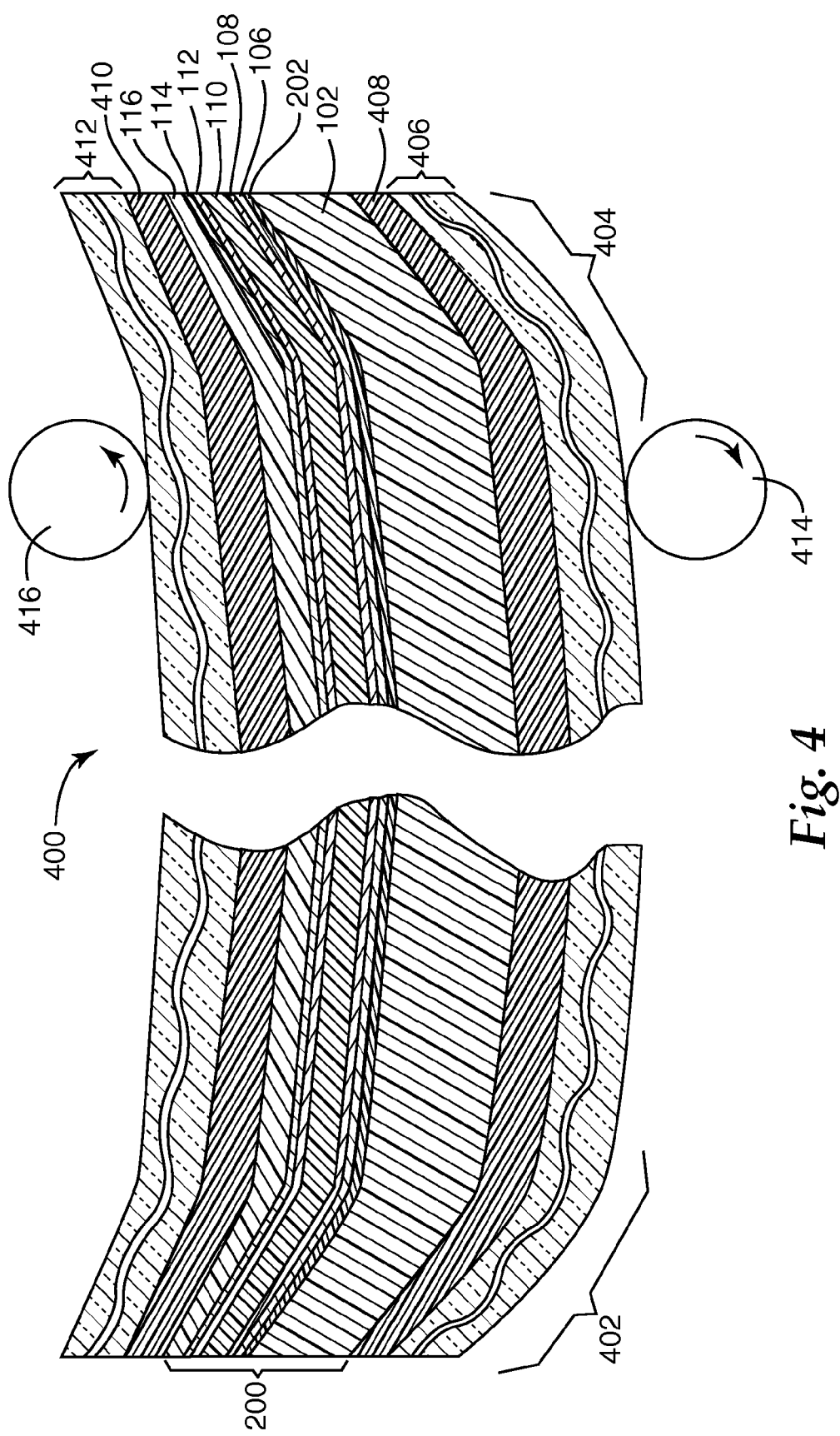
FIG. 4 is a schematic cross-sectional view of a laminated glazing article.

FIG. 4 shows a cross-sectional view of a laminated safety windshield 400. Windshield 400 has a continuously curved surface whose radius of curvature may be relatively large near the center region (shown only as broken lines in FIG. 4) of windshield 400 but which may decrease to a relatively small value near the more sharply curved end regions 402, 404 of windshield 400. Windshield 400 includes in sequence at least outer glass layer 406, first mechanical energy-absorbing layer 408 (made, for example, from plasticized polyvinyl butyral ("PVB")), solar energy control film 200 (which includes support 102, organic base coat layer 202, first nucleating oxide seed layer 106, first metal layer 108, organic spacing layer 110, second nucleating oxide seed layer 112, second metal layer 114 and protective polymer layer 116), second mechanical energy-absorbing layer 410 (also made, for example, from PVB) and inner glass layer 412. As shown in FIG. 4, nip rollers 414 and 416 are being used to de-air and tack together the glass layers 406 and 412, energy-absorbing layers 408 and 410 and film 200. The solar control film may if desired be oriented within windshield 400 so that the support is arranged nearer (e.g., adjacent) second mechanical energy-absorbing layer 410 rather than first mechanical energy-absorbing layer 410. However, when the support is a multilayer optical film ("MOF"), such as those described in U.S. Pat. No. 7,215,473 B2, the solar control film desirably is oriented so that the support is nearer the first mechanical energy-absorbing layer 410.

A variety of visible light-transmissive supports can be employed. Exemplary supports include but are not limited to flexible plastic materials including thermoplastic films such as polyesters (e.g., PET or polyethylene naphthalates), polyacrylates (e.g., polymethyl methacrylate), polycarbonates, polypropylenes, high or low density polyethylenes, polysulfones, polyether sulfones, polyurethanes, polyamides, polyvinyl butyral, polyvinyl chloride, polyvinylidene difluoride, polyethylene sulfide and cyclic olefin polymers (e.g., TOPAS™ from Topas Advanced Polymers and ZEONOR™ from Zeon Chemicals, L.P.); and thermoset films such as cellulose derivatives, polyimide, polyimide benzoxazole and polybenzoxazole. Supports made of PET and MOF are preferred. The support may have a variety of thicknesses, e.g., a thickness of about 0.01 to about 1 mm. The support may however be considerably thicker, for example, when a self-supporting solar control article is desired. Such self-supporting articles may also be made by forming the disclosed solar control film on a thin, flexible support and laminating or otherwise joining the flexible support to a thicker, inflexible or less flexible supplemental support such as a glass or plastic panel.

One or more of the smoothness, continuity or adhesion of the various solar control film layers may be enhanced by appropriate pretreatment of the support. In one embodiment, the pretreatment regimen involves electrical discharge pretreatment of the support (e.g., plasma, glow discharge, corona discharge, dielectric barrier discharge or atmospheric pressure discharge) in the presence of a reactive or non-reactive atmosphere (e.g., air, nitrogen, oxygen or an inert gas such as argon), chemical pretreatment or flame pretreatment. These pretreatments may help ensure that the surface of the support or of an overlying layer will be receptive to subsequently applied layers. In another embodiment the support is coated with an organic base coat layer such as the organic base coat layer or layers shown in FIG. 2 as layer 202, optionally followed by further pretreatment using plasma or one of the other pretreatments described above. When employed, an organic base coat layer preferably is based on one or more crosslinked acrylate polymers. If the organic base coat layer is or includes a hardcoat layer, the hardcoat preferably is based on a coating composition containing a dispersion of inorganic oxide particles such as the compositions described in U.S. Pat. No. 5,104,929 (Bilkadi). 3M 906 Abrasion Resistant Coating (from 3M Co.) is a preferred hardcoat composition. The organic base coat layer or layers may be applied using a variety of techniques including solution coating, roll coating (e.g., gravure roll coating) or spray coating (e.g., electrostatic spray coating), then crosslinked using, for example, UV radiation. An organic base coat layer (and desirably also the organic spacing layer and polymeric protective layer) preferably is applied by flash evaporation and vapor deposition of a radiation-crosslinkable monomer or oligomer (e.g., an acrylate monomer or oligomer), followed by crosslinking in situ (using, for example, an electron beam apparatus, UV light source, electrical discharge apparatus or other suitable device), as described in the above-mentioned U.S. Pat. No. 7,215,473 B2 and in U.S. Pat. Nos. 6,929,864 B2, 7,018,713 B2, and the documents cited therein. The desired chemical composition and thickness of the organic base coat layer will depend in part on the nature of the support. For PET and MOF supports the base coat layer may for example be formed from an acrylate monomer or oligomer and may for example have a thickness sufficient to provide a continuous layer (e.g., a few nm up to about 2 micrometers). The thickness of the base coat layer also may be adjusted to enhance the film optical properties, e.g., to increase transmission through the stack and minimize reflectance by the stack. Adhesion of the first nucleating oxide seed layer to the support may be further improved by including an adhesion-promoting or anticorrosion additive in the organic base coat layer. Suitable adhesion-promoting or anticorrosion additives include mercaptans, acids (such as carboxylic acids or organic phosphoric acids), triazoles, dyes and wetting agents. A specific adhesion-promoting additive, ethylene glycol bis-thioglycolate, is described in U.S. Pat. No. 4,645,714. The additive desirably is present in an amount sufficient to provide increased seed layer adhesion without causing undue oxidation or other degradation of the seed layer.

A variety of oxides may be employed in the nucleating oxide seed layers. The seed layers may be the same or different and desirably are the same. The seed layer oxide desirably promotes deposition of the subsequently-applied metal layer in a more uniform or more dense fashion, or promotes earlier formation (viz., at a thinner applied thickness) of a continuous metal layer. Selection of an appropriate oxide may depend upon the chosen support and adjacent metal layer, and normally will be made empirically. Representative seed layer oxides include gallium oxide, indium oxide, magnesium oxide, zinc oxide, tin oxide and mixtures (including mixed oxides and doped oxides) thereof. For example, the seed layers may contain zinc oxide or zinc oxide doped with aluminum or aluminum oxide. The seed layers may be formed using techniques employed in the film metallizing art such as sputtering (e.g., planar or rotary magnetron sputtering); evaporation (e.g., resistive or electron beam evaporation); chemical vapor deposition; metal organic CVD (MOCVD); plasma-enhanced, assisted, or activated CVD (PECVD); ion sputtering; and the like. A seed layer may for example conveniently be formed directly by sputtering the seed layer oxide or in situ by sputtering the precursor metal in an oxidizing atmosphere. The sputtering target may also include metals (e.g., aluminum, indium, tin or zinc) or oxides (e.g., alumina, indium oxide, indium tin oxide, tin oxide or zinc oxide) to make the sputtering target more conductive. Exemplary sputtering targets include zinc oxide:alumina, zinc oxide:gallium oxide, zinc oxide:tin oxide, indium oxide:zinc oxide, indium oxide:tin oxide, indium oxide:tin oxide:zinc oxide, indium:zinc, indium:tin, indium:tin:zinc, indium gallium zinc oxide or $Zn_{(1-x)}Mg_xO:Al$, $MgIn_2O_{(4-x)}$. Specific examples thereof include 99:1 and 98:2 zinc oxide:alumina, 95:5 zinc oxide:gallium oxide, 93:7 zinc oxide:gallium oxide, 90:10 indium oxide:zinc oxide, 90:10 and 95:5 indium oxide:tin oxide, from about 76:24 to about 57:43 indium:zinc and 90:10 indium:tin. The seed layers may have the same or different thicknesses, and preferably are each sufficiently thick so that the subsequently-applied metal layers will be homogeneous with a minimum of light absorption. The seed layers preferably are sufficiently thin so as to ensure that the resultant solar control film and articles employing the film will have the desired degree of visible light transmission and near-IR or IR reflection. For example, the seed layers may have a physical thickness (as opposed to an optical thickness) less than about 20 nm, less than about 10 nm, less than about 8 nm, less than about 5 nm, less than about 4 nm or less than about 3 nm. The seed layers may also have a physical thickness greater than 0 nm, at least 0.5 nm or at least 1 nm. In one embodiment, the seed layers have a physical thickness greater than 0 and less than about 5 nm. In a second embodiment, the seed layer physical thicknesses are greater than 0 and less than about 4 nm. In a third embodiment, the seed layer physical thicknesses are greater than 0 and less than about 3 nm.

A variety of metals may be employed in the metal layers. The metal layers may be the same or different and desirably are the same. Exemplary metals include silver, copper, nickel, chrome, noble metals (e.g., gold, platinum or palladium) and alloys thereof. The metal layers can be formed using film metallizing art techniques like those mentioned above for the seed layers, and using a non-oxidizing atmosphere for non-noble metals. The metal layers are sufficiently thick so as to be continuous, and sufficiently thin so as to ensure that the solar control film and articles employing the film will have the desired degree of visible light transmission and near-IR or IR reflection. The metal layers normally will be thicker than the seed layers. In one embodiment, the metal layers will have a physical thickness of about 5 to about 50 nm. In another embodiment, the metal layer thicknesses are about 5 to about 15 nm. In a third embodiment, the metal layer thicknesses are about 5 to about 12 nm.

The organic spacing layer lies between the first metal layer and second nucleating seed layer, and may be formed from a variety of organic materials. If desired, the spacing layer can be applied using conventional coating methods such as roll coating (e.g., gravure roll coating) or spray coating (e.g., electrostatic spray coating). The spacing layer preferably is crosslinked using, e.g., techniques like those which may be employed when a crosslinked organic base coat layer is used. A crosslinked organic spacing layer has several advantages over a non-crosslinked organic spacing layer. A crosslinked organic spacing layer will neither melt nor soften as appreciably with heating as a non-crosslinked organic spacing layer, and thus is less likely to flow, deform or thin significantly under the simultaneous influence of temperature and pressure, as during a forming or laminating process. A crosslinked organic spacing layer is highly solvent resistant, whereas a non-crosslinked organic spacing layer may be dissolved or appreciably softened by solvents including those found in automotive fluids such as gasoline, oil, transmission fluid, and window cleaners. A crosslinked organic spacing layer may also have desirable physical properties compared to a non-crosslinked organic spacing layer fabricated from a similar polymer, such as higher modulus and stiffness, better elastic recovery when strained or better resilience. Preferably the spacing layer is crosslinked in situ atop the first metal or alloy layer. The spacing layer preferably is formed by processes involving flash evaporation, vapor deposition and crosslinking of a monomer as described in the above-mentioned U.S. Pat. Nos. 6,929,864 B2, 7,018,713 B2, and 7,215,473 B2 and in the documents cited therein. Volatilizable (meth)acrylates are preferred for use in such processes, with volatilizable acrylates being especially preferred. Coating efficiency can be improved by cooling the support. Particularly preferred monomers include multifunctional (meth)acrylates, used alone or in combination with other multifunctional or monofunctional (meth)acrylates, such as hexanediol diacrylate, ethoxyethyl acrylate, phenoxyethyl acrylate, cyanoethyl (mono)acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth)acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, tris(2-hydroxyethyl) isocyanurate triacrylate, pentaerythritol triacrylate, phenylthioethyl acrylate, naphthyloxyethyl acrylate, IRR-214 cyclic diacrylate from UCB Chemicals, epoxy acrylate RDX80095 from Rad-Cure Corporation, and mixtures thereof. A variety of other curable materials can be included in the spacing layer, e.g., acrylamides, vinyl ethers, vinyl naphthalene, acrylonitrile, and mixtures thereof. The spacing layer physical thickness will depend in part upon its refractive index and in part upon the desired optical characteristics of the solar control film. A preferred optical thickness is about ¼ to ½ the wavelength of the center of the desired pass band for transmitted light. For use in an infrared-rejecting interference stack, the crosslinked organic spacing layer may for example have a refractive index of about 1.3 to about 1.7, an optical thickness of about 75 to about 275 nm (e.g., about 100 to about 150 nm) and a corresponding physical thickness of about 50 to about 210 nm (e.g., about 65 to about 100 nm). Optical modeling can be employed to select suitable layer thicknesses.

A variety of organic materials may be used to form the polymeric protective layer. If desired, the protective layer may be applied using conventional coating methods such as roll coating (e.g., gravure roll coating) or spray coating (e.g., electrostatic spray coating). The protective layer preferably is crosslinked using, e.g., techniques like those which may be employed when a crosslinked organic base coat layer is used. The protective layer may also be separately formed and applied using lamination. Preferably the protective layer is formed using flash evaporation, vapor deposition and crosslinking of a monomer or oligomer as described above. Exemplary monomers or oligomers for use in such protective layers include volatilizable (meth)acrylates. The protective layer may also contain adhesion-promoting additives. Exemplary additives include the spacing layer additives described above. When the solar control film is laminated between sheets of a mechanical energy-absorbing material such as PVB, the index of refraction of the protective layer can be selected to minimize reflection at the interface caused by any difference in refractive indices between the mechanical energy-absorbing material and the solar control film. The protective layer can also be post-treated to enhance adhesion of the protective layer to the mechanical energy-absorbing material. Exemplary post-treatments include the support pretreatments described above. In one embodiment, plasma post-treatment of both sides of the solar control film can be employed.

Various functional layers or elements may be added to the disclosed films to alter or improve their physical or chemical properties, particularly at one of the surfaces of the film. Such layers or coatings can include, for example, low friction coatings or slip particles to make the film easier to handle during the manufacturing process; particles to add diffusion properties to the film or to prevent wet-out or Newton's rings when the film is placed next to another film or surface; adhesives such as pressure sensitive adhesives or hot melt adhesives; primers to promote adhesion to adjacent layers; low adhesion backsize materials for use when the film is to be used in adhesive roll form; and electrodes to permit current flow, voltage sensing or capacitance sensing via one or both of the metal layers. The functional layers or coatings may also include shatter resistant, anti-intrusion, or puncture-tear resistant films and coatings, for example, the functional layers described in published PCT Application No. WO 01/96115 A1. Additional functional layers or coatings may also include vibration-damping or sound-absorbing film layers such as those described in U.S. Pat. Nos. 6,132,882 and 5,773,102, and barrier layers to provide protection or to alter the transmissive properties of the films towards liquids such as water or organic solvents or towards gases such as oxygen, water vapor or carbon dioxide. These functional components can be incorporated into one or more of the outermost layers of the film, or they can be applied as a separate film or coating. For some applications, it may be desirable to alter the appearance or performance of the solar control film, such as by laminating a dyed film layer to the conductive film, applying a pigmented coating to the surface of the solar control film, or including a dye or pigment in one or more of the materials used to make the solar control film. The dye or pigment can absorb in one or more selected regions of the spectrum, including portions of the infrared, ultraviolet or visible spectrum. The dye or pigment can be used to complement the properties of the solar control film, particularly where the solar control film transmits some frequencies while reflecting others. A particularly useful pigmented layer that can be employed in the disclosed films is described in U.S. Pat. No. 6,811,867 B1. This layer can be laminated, extrusion coated or coextruded as a skin layer on the films. The pigment loading level can be varied between about 0.01 and about 1.0% by weight to vary the visible light transmission as desired. The addition of a UV absorptive cover layer can also be desirable in order to protect any inner layers of the film that may be unstable when exposed to UV radiation. Other functional layers or coatings which may be added to the solar control film include, for example, antistatic coatings or films; flame retardants; UV stabilizers; abrasion resistant or hardcoat materials; optical coatings; anti-fogging materials; magnetic or magneto-optic coatings or films; liquid crystal panels; electrochromic or electroluminescent panels; photographic emulsions; prismatic films; and holographic films or images. Additional functional layers or coatings are described, for example, in U.S. Pat. Nos. 6,368,699, 6,352,761 and 6,830,713. The solar control film may be treated with, for example, inks or other printed indicia such as those used to display product identification, orientation information, advertisements, warnings, decoration, or other information. Various techniques can be used to print on the solar control film, such as, for example, screen printing, inkjet printing, thermal transfer printing, letterpress printing, offset printing, flexographic printing, stipple printing, laser printing, and so forth, and various types of ink can be used, including one and two component inks, oxidatively drying and UV-drying inks, dissolved inks, dispersed inks, and 100% ink systems.

When provided with electrodes, the disclosed solar control films may be used for purposes such as antennae, electromagnetic interference (EMI) shielding, and for electrically heated film applications such as de-fogging, de-misting, defrosting or deicing of glazing, vehicular windows and displays. Electrically heated film applications can require substantial current-carrying ability, but must employ a very thin (and accordingly very fragile) metal or metal alloy layer when visible light transparency is required. Electrically heated film applications are disclosed in U.S. Pat. Nos. 3,529,074, 4,782,216, 4,786,783, 5,324,374 and 5,332,888. Electrically heated films are of particular interest in vehicular safety glazing, for example, in the windshield, backlight, sunroof or side windows of an automobile, airplane, train or other vehicle. Electrically heated glazing may be prepared by placing the PVB layer, an electrically heated film layer and suitable electrodes between the glass layers, eliminating air from the engaging surfaces, and then subjecting the assembly to elevated temperature and pressure in an autoclave to fusion bond the PVB, electrically heated film layer and glass into an optically clear structure. Metal layers for use at low voltage in such films desirably have low electrical resistance, e.g., less than about 20 ohms per square resistance. For example, the metal layers may have from about 5 ohms per square to about 20 ohms per square resistance, from about 7.5 ohms per square to about 15 ohms per square resistance, or from about 7.5 ohms per square to about 10 ohms per square resistance.

The disclosed films can be joined or laminated to a wide variety of substrates. Typical substrate materials include glazing materials such as glass (which may be insulated, tempered, laminated, annealed, or heat strengthened) and plastics (such as polycarbonates and polymethylmethacrylate). The films may be joined to one major side of a substrate or sandwiched between two or more substrates. The films are especially useful in connection with non-planar substrates, especially those having a compound curvature. The films desirably are extensible and capable of conforming to such non-planar substrates during a lamination and de-airing process without substantial cracking or creasing. The disclosed films can be oriented and optionally heat set under conditions sufficient to assist the film in conforming without substantial wrinkling to a non-planar substrate. This is especially useful when a non-planar substrate to which a film is to be laminated has a known shape or curvature, and especially when the substrate has a known severe compound curvature. By individually controlling the shrinkage of the film in each in-plane direction, the film can be caused to shrink in a controlled fashion during lamination, e.g. during nip roll lamination or autoclaving. For example, if the non-planar substrate to which the film is to be laminated has a compound curvature, then the shrinkage of the film can be tailored in each in-plane direction to match the specific curvature characteristics of the substrate in those directions. The in-plane film direction having the greatest shrinkage can be aligned with the dimension of the substrate having the least curvature, that is, the greatest radius of curvature. In addition to or in place of characterizing curvature according to the radius of curvature, other measurements (such as the depth of a raised or depressed area measured from the geometric surface defined by a major surface of the substrate) can also be used if desired. For lamination to typical non-planar substrates, the film shrinkage can be greater than about 0.4% in both in-plane directions, greater than about 0.7% in at least one in-plane direction, or greater than about 1% in at least one in-plane direction. In one embodiment, the overall film shrinkage is limited to reduce edge delamination or "pull-in." Thus the film shrinkage can be less than about 3% in each in-plane direction, or less than about 2.5% in each in-plane direction. Shrinkage behavior will primarily be governed by factors such as the film or substrate materials employed, and the film stretch ratio(s), heatset temperature, residence time and toe-in (the decrease in rail spacing in a tenter heatset zone measured relative to a maximum rail setting). Coatings can also change film shrinkage properties. For example, a primer coating may reduce the transverse direction ("TD") shrinkage by about 0.2% to about 0.4% and increase the machine direction ("MD") shrinkage by about 0.1 to about 0.3%. Orienting and heat setting equipment can vary widely, and ideal process settings typically are determined experimentally in each case. Further details regarding techniques for manufacturing articles having targeted shrinkage properties are described in U.S. Pat. No. 6,797,396. Further details regarding techniques for manufacturing articles employing MOF supports and for making laminates employing one or two layers of glazing are described in U.S. Pat. No. 7,189,447 B2.

The disclosed solar control films and articles may be used for a variety of purposes including vehicular glazing, architectural glazing, solar cells, solar concentrators and instruments. The films may have a variety of visible light transmittance ($T_{vis}$) values, e.g., at least about 60%, at least about 70% or at least about 75% measured along the normal axis. The films preferably have high Re (Reflected Energy) and low TSHT (Total Solar Heat Transmittance) values. TSHT may be determined according to ISO Standard 9050:2003 and is a measurement of energy absorbed by glazing and radiated into a building, vehicle or other enclosure plus energy transmitted into the enclosure. TSHT and Re are related to Te (the percent of energy transmitted through a film or article) by the equation:

$$TSHT = (8/31)*(100-Te-Re)+Te$$

When the disclosed solar control films are incorporated into laminated safety glazing and measured at a 0° angle of incidence, the glazing preferably has a TSHT less than about 60%, more preferably less than about 55% and most preferably less than about 50%, and an Re of at least about 20%, more preferably at least about 25% and most preferably at least about 30%.

The invention is further illustrated in the following examples, in which all parts, percentages and ratios are by weight unless otherwise indicated.

Example 1

A PET support was coated with an optical stack containing zinc oxide nucleating seed layers, silver metal layers and organic layers made using two different acrylate mixtures (Acrylate A or Acrylate B) in an Acrylate A/ZnO/Ag/Acrylate B/ZnO/Ag/Acrylate B stack configuration. Acrylate A contained 64% IRR214 acrylate (UCB Chemicals), 28% n-lauryl acrylate and 8% ethylene glycol bis-thioglycolate. Acrylate B contained 80% phenylthioethyl acrylate and 20% pentaerythritol triacrylate. The individual layers were formed as follows:

(Layer 1) A roll of 0.05 mm thick, 508 mm wide PET film (MELINEX™ 453 from DuPont Teijin Films) was loaded into a roll to roll apparatus like that shown in FIG. 3, located inside a vacuum chamber. The pressure in the chamber was reduced to $3\times10^{-4}$ torr and the drum 308 was chilled to −18° C. The PET film as supplied by the manufacturer has an unidentified treatment on one side. The untreated side of the PET film was exposed to plasma pretreatment using a titanium target magnetron run at 1 kW DC in a nitrogen plasma. The pretreated side of the PET film was then coated with degassed, flash-evaporated Acrylate A monomer mixture at a web speed of 38.1 m/min. The monomer mixture was degassed by exposing Acrylate A to a pressure of approximately $1\times10^{-3}$ torr, and then flash-evaporated by pumping it through an ultrasonic atomizer at 2 ml/min into a vaporization chamber maintained at 274° C. The vaporized Acrylate A mixture was sprayed from the chamber onto the moving PET film where it condensed due to the low drum temperature. The condensed Acrylate A monomer mixture was then crosslinked with electron beam radiation using a single filament gun operated at 7.5 kV. The final thickness of the crosslinked Acrylate A base coat was approximately 140 nm. Pretreatment, coating and crosslinking took place sequentially in a single pass.

(Layer 2) The film direction was reversed. A first zinc oxide (ZnO) nucleating seed layer was coated at a thickness of about 1 nm onto the Acrylate A base coat.

(Layer 3) Sequentially, in the same pass, a first silver (Ag) metal layer was coated at a thickness of about 6.75 nm onto the first ZnO seed layer.

(Layer 4) Sequentially, in the same pass, a spacing layer made from the Acrylate B monomer mixture was coated onto the Ag layer and crosslinked in the same manner as described for Layer 1 except the crosslinked spacing layer thickness was about 120 nm.

(Layer 5) The film direction was reversed. A second ZnO nucleating seed layer was coated at a thickness of about 1 nm onto the Acrylate B spacing layer.

(Layer 6) Sequentially, in the same pass, a second Ag metal layer was coated at a thickness of about 6.75 nm onto the second ZnO seed layer.

(Layer 7) Sequentially, in the same pass, a protective layer made from Acrylate B was coated onto the second Ag layer and crosslinked in the same manner as described for Layer 1 except the protective layer thickness was about 65 nm.

Both sides of the resulting solar control film were subsequently plasma treated. The film was laminated into the center of a 5 layer automotive windshield safety glazing construction having a glass/PVB/film/PVB/glass configuration.

Example 2

Using the general method of Example 1, a multilayer optical film (3M™ Solar Reflecting Film from 3M Co.) was coated with an optical stack containing zinc oxide nucleating oxide seed layers, silver metal layers and organic layers made using an acrylate mixture (Acrylate C) in an Acrylate C/ZnO/Ag/Acrylate C/ZnO/Ag/Acrylate C stack configuration. Acrylate C contained 90% phenylthioethyl acrylate, 5% pentaerythritol triacrylate, and 5% of a 50:50 mixture of difunctional bisphenol A-based epoxy acrylate and ethoxylated trimethylol propane triacrylate. The individual layers were formed as in Example 1 except that the thickness of the Acrylate C base coating was about 120 nm, the thickness of the first and second Ag layers was about 8 nm, the thickness of the Acrylate C spacing layer was about 112 nm, the thickness of the Acrylate C protective layer was about 62 nm and a plasma pretreatment was used between application of the metal layers and the overlying organic layers.

Both sides of the resulting solar control film were subsequently plasma treated. The film was laminated into the center of a 5 layer automotive windshield safety glazing construction having a glass/PVB/film/PVB/glass configuration.

Example 1 and Example 2 Evaluation

Figure 5:
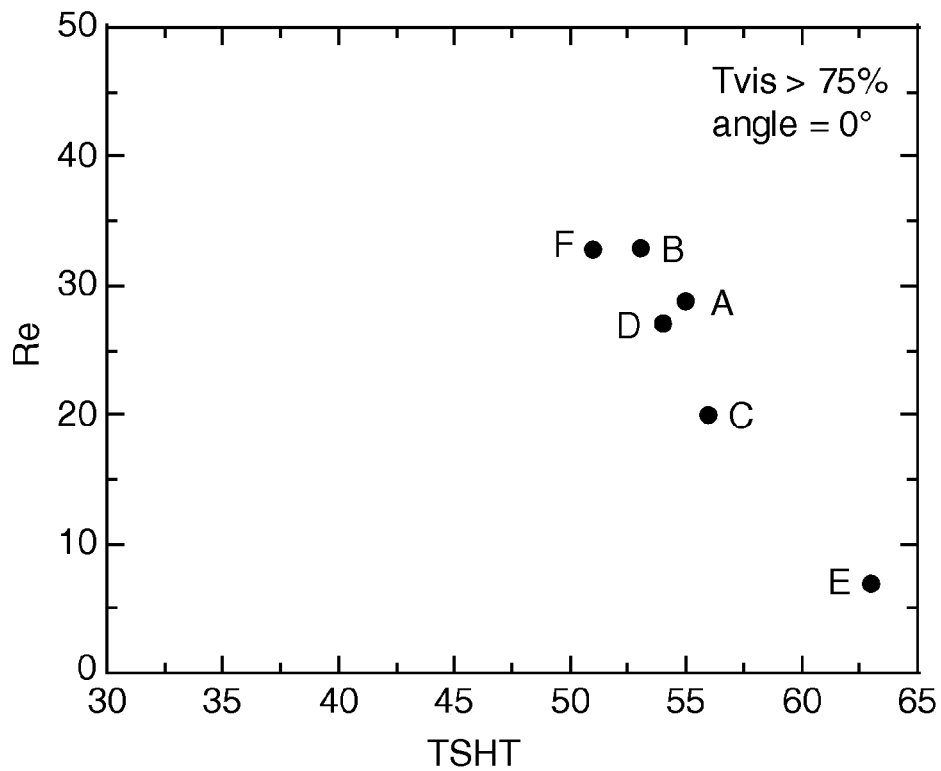
FIG. 5 and FIG. 6 are graphs showing Reflected Energy (Re) vs. Total Solar Heat Transmission (TSHT) for several solar control films.

The Example 1 and Example 2 windshield constructions were evaluated to determine $T_{vis}$, Re and TSHT at a 0° angle of incidence, and are respectively identified as samples A and B in Table 1 and FIG. 5. Comparison measurements were obtained for a 5 layer construction made using uncoated 3M Solar Reflecting Film (Sample C), a 5 layer construction made using XIR-75 film from Southwall Corporation (Sample D), a 3 layer construction made using S-LEC solar film (an IR-absorbing particle-filed PVB substitute from Sekisui Chemical Co., Ltd.) in a glass/film/glass configuration (Sample E), and a 3 layer construction made using SUNGATE metal coated glass from PPG Industries, Inc. in a coated glass/PVB/uncoated glass configuration with the glass coating facing the PVB layer (Sample F). The $T_{vis}$ results are shown below in Table 1 and the Re and TSHT results are shown in FIG. 5.

TABLE 1

| Sample | Solar Control Element | Laminate Configuration | $T_{vis}$, % |
|---|---|---|---|
| A | Example 1 Film | glass/PVB/film/PVB/glass | 77 |
| B | Example 2 Film | glass/PVB/film/PVB/glass | 78 |
| C | 3M Solar Reflecting Film | glass/PVB/film/PVB/glass | 79 |
| D | XIR-75 film | glass/PVB/film/PVB/glass | 79 |
| E | S-LEC Film | glass/film/glass | 83 |
| F | SUNGATE Metal Coated Glass | glass/film/glass | 77 |

The Example 1 and Example 2 films satisfy European, U.S. and Japanese visible light transmission requirements for automotive windshields, and provided laminates with very good Re and TSHT performance. The Example 1 (Sample A) and Example 2 (Sample B) film laminates provided better (viz., numerically greater) Re performance than laminates made using uncoated multilayer optical film (Sample C), XIR-75 film (Sample D) or S-LEC film (Sample E). The Example 1 film laminate provided better (viz., numerically lower) TSHT performance than laminates made using uncoated multilayer optical film or S-LEC film, and the Example 2 film laminate provided better TSHT performance than laminates made using uncoated multilayer optical film, XIR-75 film or S-LEC film. Despite having more reflective interfaces, the Example 2 film laminate also provided Re performance comparable to that provided by the metal-coated glass laminate and very good albeit slightly lower Re performance. Both the Example 1 and Example 2 films were extensible, robust and capable of resisting damage during handling and processing.

Example 3

Using the general method of Example 1, a PET support was coated with an optical stack containing zinc oxide nucleating oxide seed layers, silver metal layers and organic layers made using an acrylate mixture (Acrylate A) in an Acrylate A/ZnO/Ag/Acrylate A/ZnO/Ag/Acrylate A stack configuration. The individual layers were formed as in Example 1 except that a 32 m/min web speed was employed, the thickness of the Acrylate A base coating was about 120 nm and the thickness of the first and second Ag layers was about 6.5 nm. Both sides of the resulting solar control film were subsequently plasma treated. The film was laminated into the center of a 5 layer automotive sidelight safety glazing construction having a glass/PVB/film/PVB/glass configuration.

Example 4

Using the general method of Example 2, the multilayer optical film support was coated with an optical stack containing zinc oxide nucleating oxide seed layers, silver metal layers and organic layers made using an acrylate mixture (Acrylate A) in an Acrylate A/ZnO/Ag/Acrylate A/ZnO/Ag/Acrylate A stack configuration. The individual layers were formed as in Example 2 except that a 32 m/min web speed was employed and the thickness of the first and second Ag layers was about 6.5 nm. Both sides of the resulting solar control film were subsequently plasma treated. The film was laminated into the center of a 5 layer automotive sidelight safety glazing construction having a glass/PVB/film/PVB/glass configuration.

Example 3 and Example 4 Evaluation

Figure 6:
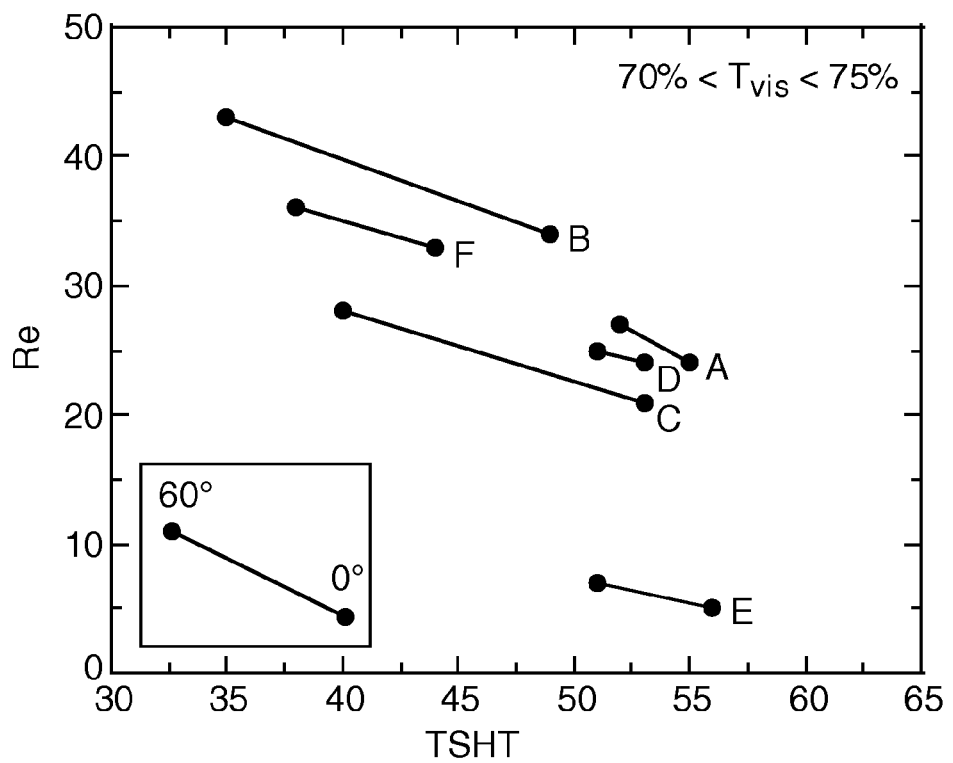

The Example 3 and Example 4 sidelight constructions were evaluated to determine $T_{vis}$, Re and TSHT at both 0° and 60° angles of incidence and are respectively identified as samples A and B in Table 2 and FIG. 6. Comparison measurements were obtained for a 5 layer construction made using uncoated 3M Solar Reflecting Film (Sample C), a 5 layer construction made using XIR-70 film (Sample D), (c) a 3 layer construction made using S-LEC solar film in a glass/film/glass configuration (Sample E), and a 3 layer construction made using SUNGATE metal coated glass in a coated glass/PVB/uncoated glass configuration with the glass coating facing the PVB layer (Sample F). The $T_{vis}$ results are shown below in Table 2 and the Re and TSHT results are shown in FIG. 6. The connected endpoints for each sample show the results obtained at 0° and 60° angles of incidence, with the observed 60° values generally lying to the left and above (viz., at greater Re and lower TSHT values than) the 0° values. Measurements at a 60° angle of incidence are not normally reported, but are shown in FIG. 6 to illustrate that Re and TSHT performance can be angularly dependent.

TABLE 2

| Sample | Solar Control Element | Laminate Configuration | $T_{vis}$, % |
|---|---|---|---|
| A | Example 3 Film | glass/PVB/film/PVB/glass | 73 |
| B | Example 4 Film | glass/PVB/film/PVB/glass | 72 |
| C | 3M Solar Reflecting Film | glass/PVB/film/PVB/glass | 73 |
| D | XIR-70 film | glass/PVB/film/PVB/glass | 74 |
| E | S-LEC Film | glass/film/glass | 73 |
| F | SUNGATE Metal Coated Glass | glass/film/glass | 71 |

The Example 3 and Example 4 films satisfy European, U.S. and Japanese visible light transmission requirements for automotive sidelights, and provided laminates with very good Re and TSHT performance. Focusing for the moment on the 0° results, the Example 1 (Sample A) and Example 2 (Sample B) film laminates provided better (viz., numerically greater) Re performance than laminates made using uncoated multilayer optical film (Sample C) or S-LEC film (Sample E). The Example 2 film laminate also provided better Re performance than the laminate made XIR-75 film (Sample D) or the metal-coated glass laminate (Sample F), and better (viz., numerically lower) TSHT performance than laminates made using uncoated multilayer optical film, XIR-75 film or S-LEC film, and the Example 2 film laminate provided better TSHT performance than laminates made using uncoated multilayer optical film, XIR-75 film or S-LEC film. Both the Example 3 and Example 4 films were extensible, robust and capable of resisting damage during handling and processing.

We claim:

1. A solar control film comprising in sequence at least a visible light-transmissive flexible support, a first discontinuous nucleating oxide seed layer formed as a series of small islands, a first metal layer, an organic spacing layer, a second nucleating oxide seed layer formed as a series of small islands, a second metal layer and a polymeric protective layer, wherein the seed layers each have a physical thickness greater than 0 and less than 5 nm, the metal layers each have a physical thickness of 5 to 12 nm, and the organic spacing layer has a refractive index of 1.3 to 1.7 and an optical thickness of 75 to 275 nm, further wherein the film is visible light-transmissive and infrared-reflective.

2. The film of claim 1 wherein the support comprises a multilayer optical film.

3. The film of claim 1 further comprising an organic base coat layer between the support and the first seed layer.

4. The film of claim 3 wherein the organic base coat layer comprises an acrylate polymer.

5. The film of claim 1 wherein a seed layer comprises gallium oxide, indium oxide, magnesium oxide, zinc oxide or mixture thereof.

6. The film of claim 1 wherein the first and second seed layers comprise zinc oxide.

7. The film of claim 1 wherein the first and second seed layers comprise zinc oxide doped with aluminum or aluminum oxide.

8. The film of claim 1 wherein the first and second metal layers comprise silver.

9. The film of claim 1 wherein the organic spacing layer comprises an acrylate polymer.

10. The film of claim 1 wherein a laminated safety glazing article incorporating the solar control film, exhibits at least about 70% visible light transmittance measured at a 0° angle of incidence corresponding to the normal axis to the film.

11. The film of claim 1 wherein a laminated safety glazing article incorporating the solar control film, exhibits at least about 75% visible light transmittance measured at a 0° angle of incidence corresponding to the normal axis to the film.

12. A laminated glazing article comprising in sequence at least a first glazing material layer, a first mechanical energy-absorbing layer, a solar control film according to claim 1, a second mechanical energy-absorbing layer and a second glazing material layer.

13. The article of claim 12 wherein the article has at least about 70% visible light transmittance, Total Solar Heat Transmission less than about 60%, and Reflected Energy of at least about 20%.

14. The article of claim 12 wherein the article has at least about 75% visible light transmittance, Total Solar Heat Transmission less than about 60%, and Reflected Energy of at least about 25%.

15. A method for forming a solar control film, which method comprises:
   a) providing a visible light-transmissive flexible support,
   b) forming a first discontinuous nucleating oxide seed layer formed as a series of small islands atop the support,
   c) forming a first metal layer atop the first seed layer,
   d) forming an organic spacing layer atop the first metal layer,
   e) forming a second discontinuous nucleating oxide seed layer formed as a series of small islands atop the spacing layer,
   f) forming a second metal layer atop the second seed layer, and
   g) forming a visible light-transmissive polymeric protective layer atop the second metal layer,
   wherein each of the discontinuous nucleating oxide seed layers has a physical thickness greater than 0 and less than 5 nm, each of the metal layers has a physical thickness of 5 to 12 nm, and the organic spacing layer has a refractive index of 1.3 to 1.7 and an optical thickness of 75 to 275 nm, further wherein the film is visible light-transmissive and infrared-reflective.

16. A method according to claim 15 wherein the support comprises a multilayer optical film.

17. A method according to claim 15 further comprising forming an organic base coat layer between the support and the first seed layer.

18. A method according to claim 15 wherein a laminated safety glazing article incorporating the solar control film, exhibits at least about 70% visible light transmittance measured at a 0° angle of incidence corresponding to the normal axis to the film.

* * * * *

UNITED STATES PATENT AND TRADEMARK OFFICE
CERTIFICATE OF CORRECTION

PATENT NO. : 9,034,459 B2
APPLICATION NO. : 12/810110
DATED : May 19, 2015
INVENTOR(S) : Peter Condo Page 1 of 1

It is certified that error appears in the above-identified patent and that said Letters Patent is hereby corrected as shown below:

Specification

<u>Column 1</u>
Line 28, Delete "SUNGATET™" and insert -- SUNGATE™ --, therefor.

Signed and Sealed this
Twelfth Day of January, 2016

Michelle K. Lee
*Director of the United States Patent and Trademark Office*